United States Patent
Hwang

(10) Patent No.: US 8,397,509 B2
(45) Date of Patent: Mar. 19, 2013

(54) CATALYTIC ENGINE

(76) Inventor: Herng Shinn Hwang, Livingston, NJ (US)

( * ) Notice: Subject to any disclaimer, the term of this patent is extended or adjusted under 35 U.S.C. 154(b) by 1226 days.

(21) Appl. No.: 12/156,581

(22) Filed: Jun. 3, 2008

(65) Prior Publication Data

US 2008/0302104 A1 Dec. 11, 2008

Related U.S. Application Data

(60) Provisional application No. 60/933,543, filed on Jun. 6, 2007.

(51) Int. Cl.
*F02C 1/00* (2006.01)
*F02G 3/00* (2006.01)

(52) U.S. Cl. ......... 60/723; 60/39.52; 60/39.5; 60/39.53; 60/39.55; 60/39.182; 60/777

(58) Field of Classification Search ............ 60/723, 60/777, 39.52, 39.5, 39.53, 39.55, 39.182; 431/170

See application file for complete search history.

(56) References Cited

U.S. PATENT DOCUMENTS

| | | | |
|---|---|---|---|
| 2,944,396 A * | 7/1960 | Barton et al. ............... 60/775 |
| 3,975,900 A | 8/1976 | Pfefferle | |
| 4,024,912 A * | 5/1977 | Hamrick et al. ............ 166/57 |
| 4,522,894 A | 6/1985 | Hwang et al. | |
| 5,235,804 A | 8/1993 | Colket et al. | |
| 5,326,253 A | 7/1994 | Dalla Betta | |
| 5,794,601 A | 8/1998 | Pantone | |
| 5,896,738 A * | 4/1999 | Yang et al. ................ 60/775 |
| 5,947,063 A * | 9/1999 | Smith et al. ................ 123/3 |
| 5,987,878 A * | 11/1999 | Koyama et al. ............ 60/39.12 |
| 6,358,040 B1 | 3/2002 | Pfefferle et al. | |
| 6,415,775 B1 | 7/2002 | Lahti et al. | |
| 6,436,363 B1 | 8/2002 | Hwang et al. | |
| 6,960,840 B2 | 11/2005 | Willis et al. | |
| 6,977,067 B2 | 12/2005 | Hwang et al. | |
| 7,255,848 B2 | 8/2007 | Deluga et al. | |
| 7,262,334 B2 | 8/2007 | Schmidt et al. | |
| 2004/0180974 A1* | 9/2004 | Espinoza et al. ........... 518/726 |
| 2007/0275278 A1 | 11/2007 | Hwang | |
| 2009/0266772 A1* | 10/2009 | Martinezd de la Ossa Fernandez et al. ...................... 210/761 |

* cited by examiner

*Primary Examiner* — Phutthiwat Wongwian
*Assistant Examiner* — Craig Kim

(57) ABSTRACT

A catalytic engine comprises a catalytic reformer and a turbine, and it employs the process steps of introducing a reactant mixture of fuel, air, water and recycled exhaust gas into a reaction zone, reacting said fuel mixture over oxidation catalysts in the reaction zone by adjusting the $CO_2/C$, $H_2O/C$, $O_2/C$ ratios and the % fuel of the reactant mixture to maintain the reactor at a temperature between 150-1100° C. and a pressure between 1 to 100 atmosphere, and feeding said refromate stream from said reaction zone to drive a downstream turbine, a turbocharger or any kind of gas turbine. This catalytic engine can be connected to an electrical generator to become a stationary or mobile power station, which can be used in transportation, industrial, utility and household applications.

17 Claims, 4 Drawing Sheets

CATALYTIC ENGINE

CROSS REFERENCE INFORMATION

This application claims benefit to and priority of U.S. Provisional Application No. 60/933,543 filed on Jun. 6, 2007, herein incorporated by reference in its entirety.

FIELD OF THE INVENTION

The present invention describes a new low cost catalytic engine, which consists of a catalytic reformer and a turbine. This catalytic engine can be used to drive devices or equipments used for utility and transportation applications, and it can also be connected to an electric generator to become a stationary or a mobile power station.

BACKGROUND OF THE INVENTION

Conventional Power Plant Boilers

Industrial power plants for generating large scale electrical power typically burn fossil fuels and/or biomass to generate large amount of heat, which is used to produce high pressure steam in a boiler. The steam is then fed into a steam turbine to generate electricity.

Such conventional means suffer from a number of drawbacks. For example, these processes consume an enormous amount of fossil fuel, generate an excessive amount of undesirable waste heats as well as greenhouse gases and produce pollutants such as carbon dioxide, nitrogen oxides, sulfur oxides etc. Furthermore, thermal inefficiency arises when the combustion heat is transferred from the shell side to the tube side of a boiler in order to heat and produce steam for the turbine.

With worldwide fossil fuel resources slowly becoming strained and the harmful effects of excess greenhouse gases and other pollutants becoming better understood, more efficient, low cost, reliable, portable and cleaner technologies for producing electricity are needed.

Internal Combustion Engines and Gas Turbines:

In the 20th century, various type of internal combustion (IC) engines and gas turbines has successfully been developed and been widely used over the years in the stationary power generation, transportation and utility applications. For example, the 2-stroke and 4-stroke engines are used for motorcycle, chainsaw, lawn mower, weed eater, automobile, small power generator etc, the diesel engines are used for truck, bus, stationary power generator etc, and the gas turbines are used for airplanes, power generators etc. Currently, most of the IC engines and gas turbines utilize homogeneous flame combustion of various hydrocarbons (HC) to generate power, and it is known that the timing of ignition, the composition of the fuel/air mixture, the vaporization of the fuels, and the temperature and pressure at the ignition point are very important for a complete combustion. However, despite all the necessary controls and the technology advances over the years, any internal combustion engine or gas turbine will still emit pollutants such as unburned hydrocarbons, CO, $NO_x$, diesel particulates etc.

To reduce the HC, CO, $NO_x$ and diesel particulate pollutants from the internal combustion engine's exhaust, catalytic converters and/or diesel particulate traps containing supported Pt group metal catalyst have successfully been used commercially for several decades. However, for this pollution removing technology, it is necessary to use an on-board computer as well as various electronic/mechanical devices to reduce the pollutants by controlling precisely the ignition timing, and the air/fuel ratio of the combustion gas. Also, these devices are required to improve the efficiency of the catalytic converters or traps, which are installed in the engine's exhaust pipe lines.

Various other types of IC engines have also been developed successfully in recent years, and these engines can use different fuels such as hydrogen, natural gas, liquefied propane gas, gasoline/ethanol mixture (flex fuel), diesel/bio-diesel mixture etc.

Catalytic Combustion Technology:

Since 1970's, extensive research and development on catalytic combustion technologies have been studied over the years. As demonstrated in U.S. Pat. Nos. 3,975,900, 5,235,804, 5,326,253 and 6,358,040, herein incorporated by references, the catalytic combustion of HC over the supported Pd and other catalysts using various type of reactor designs can reduce the reaction's peak temperature and, thus, can reduce the formation of $NO_x$, while achieving low CO and HC emissions. However, the reaction peak temperatures are frequently found to be exceeding the upper limits of the catalyst, and they would shorten the catalyst life and cause failures during the applications.

In U.S. Pat. No. 6,960,840 to Willis et al, herein incorporated by reference, two catalytic reactors are used with a gas turbine generator to achieve better exhaust emission. Air and natural gas are first compressed and heat exchanged and a primary catalytic reactor is used to raise the turbine's inlet temperature. After the turbine, a second low-pressure catalytic reactor is used to combust the remaining fuels and to recover the heat.

When water, $CO_2$ or the recycled exhaust gas (contains steam and $CO_2$) are not part of the feed mixture as shown by various catalytic combustion technologies, the produced reaction heats are not absorbed by these steam and $CO_2$, which are high heat capacity compounds. Therefore, a sudden momentary increase in $O_2/C$ ratio of the feed mixture can cause the run away oxidation reactions over the Pt group metal and/or commercial oxidation catalysts, and produce within a few milliseconds excess reaction heats. These heats can permanently deactivate or even melt and destroy the catalysts, and thus reduce the reactor's reliability and its useful life.

Fuel Cells Cars and Buses:

Fuel cells offer much promise and potential as a more efficient and cleaner process for generating electricity. Therefore, fuel cells can potentially be used to replace the internal combustion engines for the stationary power generation, utility and the transportation applications.

A number of different fuel cells are known in the art, including but not limited to Solid Oxide Fuel Cell (SOFC), Proton Exchange Membrane Fuel Cell (PEMFC), Phosphoric Acid Fuel Cell (PAFC), Alkaline Fuel Cell (AFC), Molten Carbon Fuel Cell (MCFC), Direct Methanol Fuel Cell etc. Since PEMFC and SOFC can provide higher power density, they are considered to be the leading fuel cell technologies for automobile and bus.

In its simplest form, fuel cells produce electricity through reactions between fuel and an oxidant brought into contact with two catalytic electrodes and an electrolyte. For example, hydrogen fuel and oxygen are reacted over electrodes to produce water (steam) and electricity by an electrochemical process. Other byproducts such as carbon dioxide may be present as well. The result is a far more thermally efficient and cleaner process for generating electricity.

However, despite the technology improvements in recent years, every fuel cell technology has limited short operating life, difficult for mass production, and still very expensive and unreliable. Therefore, the commercialization of hydrogen fuel cells for large scale applications is still under development and is expected to remain so in the near future. For example, PEMFC requires a constant and continuous supply of hydrogen to generate electricity and thus, a reliable source of hydrogen becomes a limitation in this process. Furthermore, fuel cell catalysts are sensitive to some residual hydrocarbons and/or impurities such as sulfur, calcium, magnesium etc. and thus, the hydrogen fuel also needs to be purified, a yet further limitation of this process. Another required improvement in fuel cell technology is the seamless integration of the fuel reformer and the fuel cell stack for long hour continuous and reliable operation. A sudden increase/decrease in power requirement can cause flow disturbance to the reformer and thus create unstable operation in the fuel cell stacks.

Fuel Pretreater, Vaporizer and Delivery System:

In U.S. Pat. No. 6,415,755 to Lathi and Johnson, herein incorporated by reference, a plate or a tube fuel processor is used to vaporize the fuel with the hot exhaust gas before injecting the fuel into a combustion source. In U.S. Pat. No. 5,794,601 to Pantone, herein incorporated by reference, a fuel pretreating apparatus and the method for pretreating an alternate fuel for internal combustion engines, furnaces, boilers and turbines are described. In this patent, an engine's by-pass exhaust stream is used to vaporize fuel in a volatilization chamber and also to carry this HC fuel through a heated reactor prior to its being introduced into the fuel burning equipment, such as an IC engine. The reactor is preferably interposed in the exhaust conduit and is formed by a reactor tube having a reactor rod mounted coaxially therein in spaced relationship. The exhaust stream passing through the exhaust conduit provides the thermal energy to the reactor to pretreat the vaporized fuel stream. This fuel processor for pretreating the fuels was later explained by the inventor as a self-inducing plasma generator. In this patent, the Pt group metal and/or commercial oxidation catalysts and the catalytic processes were not used to carry out the oxidation reactions of the fuels with the recycled exhaust gas, and it did not describe the requirement and necessity of controlling the $O_2/C$, $H_2O/C$ and $CO_2/C$ ratios of the fuel mixture.

Integrated Catalytic and Turbine System and Process for the Generation of Electricity:

A co-pending application U.S. Ser. No. 11/711,988 was filed on Feb. 28, 2007. According to this invention, a single integrated catalytic and turbine generator or a system combining in series several single integrated catalytic and turbine generators can be used to generate electricity. For example, a fuel mixture comprising the HC (or bio-fuel), steam and an oxygen containing gas are introduced into the reformer and are reacted over a Pt group metal catalyst in a reaction zone to produce a high pressure reformate containing steam, $H_2$, CO, $CO_2$, $N_2$, $O_2$ and unconverted HC. This high-pressure reformate stream can be used to drive a turbine and a generator to produce electricity. However, to improve the durability of the catalyst life, the $H_2O/C$ and $O_2/C$ ratios of the feed stream must be controlled individually and/or simultaneously so that the temperature in the reactor zone can continuously be kept between 150 and 1200° C., preferably between 150 and 1100° C.

From thermodynamic equilibrium calculations as demonstrated in this co-pending patent application, the addition of water (the term "water" encompass "steam") into the air and fuel feed mixture can reduce the adiabatic temperature, and the reactor can be operated without coke formation in a broader range of $O_2/C$ and $H_2O/C$ ratios. In addition, due to higher heat capacity, the oxidation reactions of the fuels in the presence of steam can reduce the reaction peak temperature and thus can improve the durability, life and the performance of the catalyst.

In this invention, the above integrated catalytic and turbine generator system can be simplified by operating the reformer at higher $O_2/C$, $H_2O/C$ and $CO_2/C$ ratios but with limited % fuel in the feed mixture. For example, additional $CO_2$, air, water and the recycled reformate (contains steam and $CO_2$) can be injected into the feed stream of a reactor to increase these ratios. Since both $CO_2$ and steam, which have higher heat capacity, can absorb more reaction heats and since the % fuel in the feed mixture is controlled below a certain level to limit the total (maximum) amount of reaction heat produced, a single reformer can be operated at a temperature below 1200° C. without producing any pollutants. It is known that, under the excess oxygen condition, only the catalytic complete combustion reactions of fuels will occur, and the catalytic partial oxidation reactions of fuels to produce $H_2$ and CO can be avoided. Therefore, the reformer in this invention will use complete oxidation reactions of fuels to generate heat to provide a high temperature and high pressure reformate for the turbine.

The present invention addresses the shortcomings of other integrated systems and provides an alternate low cost and reliable catalytic engine, which can be used alone or can be combined with a generator to produce electricity to be used for the applications in transportation, utility and stationary or mobile power generation.

This catalytic engine can use most of the hydrocarbons and/or renewable energy fuels in an efficient, clean and readily available manner. Furthermore, during the energy transformation processes, the atmospheric $CO_2$ can be recycled and be converted naturally by tree, grass and plants into various products, and these products can then be made into energy fuels. Thus, the net $CO_2$ produced from these fuels by this invention is counted as zero according to the Kyoto Protocol. In other words, the use of renewable biofuels for the catalytic engine by this invention can effectively reduce the overall greenhouse gas production.

SUMMARY OF THE INVENTION

There is a provided a catalytic engine comprising (1). The process steps of introducing a reactant mixture of limited % fuel, water, portion of the engine's (recycled) exhaust gas and supplemental amount of air in a given range of $O_2/C$, $H_2O/C$ and $CO_2/C$ ratios into a reaction zone (i.e. oxidizer), (2). Reacting said reactant mixture over Pt group metal and/or commercial oxidation catalysts in said reaction zone by complete combustion reactions at a given temperature between 150-1200° C. and a pressure between 1 to 100 atmosphere to produce rapidly (typically <300 milliseconds) and directly without using a heat exchanger a reformate stream comprising mainly of steam, $CO_2$, $N_2$ and $O_2$, and (3). Feeding said high pressure reformate stream from said reaction zone to drive a downstream steam turbine, turbocharger or any type of gas turbine. This catalytic engine can be used directly to drive devices or equipments used for transportation and utility applications, or it can optionally be connected to an electric generator to produce electricity and be used as a stationary or a mobile power station.

The new and novel catalytic engine is consisting of a catalytic reformer and a turbine. The fuel mixture feeding into the reformer of this catalytic engine comprises fuel or a fuel mixture, steam, a recycled reformate stream with optionally additional controlled amount of air. The fuels mentioned here are $C_1$-$C_{16}$ hydrocarbons, $C_1$-$C_8$ alcohols, vegetable oils, bio-ethanol, bio-diesel, any fuels derived from biomass or from agriculture/industrial/animal wastes etc. In other words, any fossil or bio-fuels, which can completely be oxidized with excess oxygen over the Pt group metal and/or commercial oxidation catalysts, are good candidates for this invention.

The reaction zone includes a catalyst composition comprising one or more Pt group metals and/or commercial oxidation catalysts preferably supported on various types of ceramic monolith, metallic monolith, pellet, wire mesh, screen, foam, gauge, plate etc. To improve the catalyst's durability and increase the engine's operating life, it is necessary to optimize and control individually or simultaneously the % fuel, $H_2O/C$, $CO_2/C$ and $O_2/C$ ratios in the feed mixture so that the reactor's catalyst temperature is constantly kept below 1200° C. (preferably <1100° C.). Depend on the latent heat of the fuiel used; the maximum % fuel in the feed mixture can be various. But, it must have an upper limit to avoid producing too much combustion heats, which will deactivate or even melt the catalyst. Furthermore, the $H_2O/C$ ratio is preferably greater than 3.0, the $O_2/C$ ratio greater than 1.0, and the $CO_2/C$ ratio >0.05. However, the $CO_2/C$ ratio can be 0.0 if the exhaust gas is not recycled back to the system.

Since the turbine and/or the turbo charger are driven by pressure, the gas composition in each reformate mixture is not an important factor in driving the turbine or a turbocharger. Therefore, contrary to the fuel cell applications where the $O_2/C$ ratio must be limited within a very narrow range so that the reformer can produce CO and $H_2$ by the catalytic partial oxidation reactions, the operating conditions in this invention to generate high pressure reformate stream can be optimized in a much wider $O_2/C$ range in a reaction zone. Furthermore, in order to be a pollution free catalytic engine, excess oxygen should be provided to the feed mixture so that the HC or fuels will be completely combusted over the Pt group metal and/or commercial oxidation catalyst into $CO_2$ and $H_2O$, and the final vent gas will consist mainly of steam (water), $CO_2$, $O_2$ and $N_2$.

DESCRIPTION OF THE PREFERRED EMBODIMENTS

Figure 1:
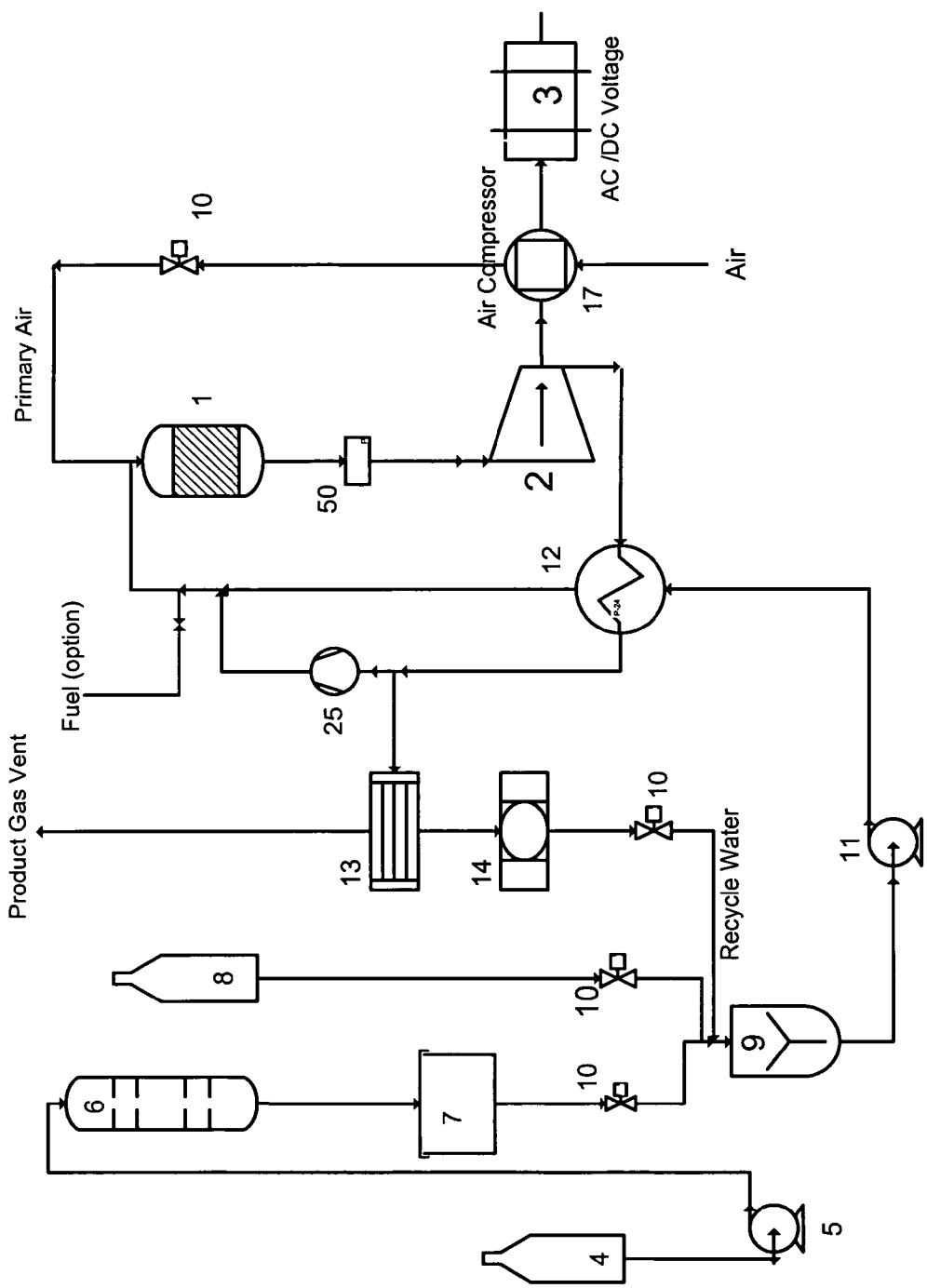
FIG. 1 is a schematic illustration of an integrated system containing a catalytic engine for generating electricity in accordance with an exemplary embodiment of the present invention.

A new and novel catalytic engine consisting of a catalytic reformer and a turbine is provided. It can be combined with a generator to produce electricity from hydrocarbon and/or any renewable bio-fuels. This new catalytic engine comprises introducing a fuel mixture into a reaction zone, reacting said fuel mixture over a Pt group metal and/or a commercial oxidation catalyst with recycled exhaust gas and/or additional excess amount of air to produce a high-pressure and high temperature reformate stream, feeding said reformate stream from said reaction zone to drive a turbine or a turbo charger.

Hydrocarbon Reaction Zone

In the first step of the process for the present invention, a fuel mixture is introduced into a reaction zone. The reactant mixture may comprise of fuels, steam, an oxygen containing gas and/or a recycled reformate gas containing steam and $CO_2$. The fuels may be any $C_1$-$C_{16}$ hydrocarbons, $C_1$-$C_8$ alcohols, vegetable oils, bio-ethanol, bio-diesel, any combustible fuels derived from biomass or from agriculture/industrial/animal wastes etc. Typical useful fuels which can completely be oxidized over a Pt group metal and/or a commercial oxidation catalyst in a catalytic reactor include but are not limited to $C_1$-$C_{16}$ hydrocarbons (methane, LPG, gasoline, diesel, jet fuels), natural gas, sugar, glucose, animal fats, $C_1$-$C_8$ alcohols, vegetable oils, soybean oil, corn oil, olive oil, jatropha oil, bio-ethanol, bio-diesel, biobutanol, bio-methane, bio-fuels derived from biomass or from agriculture/industrial/animal wastes, an industrial waste exhaust containing volatile organic compounds (VOC, mainly organic solvents) etc.

The oxygen containing gas may be air, oxygen or any other gaseous mixture such as recycled exhaust gas, which contains oxygen, $CO_2$ and steam (water).

The fuel, steam, oxygen and/or the recycled reformate may be mixed prior to feeding into the reaction zone, or may be fed separately into the reaction zone. Even if the reactants are introduced into the reaction zone separately, they become mixed in the reaction zone, and thus, this embodiment is still encompassed by the language used herein that the fuel mixture is introduced into the reaction zone.

Any conventional reactors may be used as the reaction zone. The reactor may take the form of a reformate generator or a reformer.

The reaction zone includes a catalyst composition, which can be a Pt group metal and/or commercial oxidation catalyst unsupported or supported with any known supports. If supported, the Pt group metals can be deposited on the surface of the support directly, or they can first be supported on a high surface area washcoat material, and this catalyzed washcoat can then be coated on the surface of a more thermally stable low surface area material. Examples of viable high surface area washcoat support include but are not limited to alumina, alumina-silica, alumina-silica-titania, cerium oxides, zirconium oxide, cerium-zirconium-rare earth oxide and its composite, and other oxide composite thereof. Furthermore, one or more rare earth metal oxides, alkaline oxides and/or the oxides of lanthanum, cerium, zirconium, praseodymium, yttrium, calcium, barium, strontium, magnesium etc can be used to stabilize thermally the above washcoat materials. Examples of the low surface area supports can be any high temperature metals or ceramic materials such as mullite, cordierite, zirconia-spinel, zirconia-mullite, silicon carbide etc. These low surface area supports are substantially inert rigid materials, which are capable of maintaining their shape, surface area and a sufficient degree of mechanical strength at high temperatures. In other words, the catalyst composition including at least one Pt group metal components such as platinum, palladium, rhodium, iridium, osmium and ruthenium or mixtures thereof is preferably supported on a high surface area washcoat, and this catalyzed washcoat is then supported on various types and shapes of ceramic monolith, metallic monolith, pellet, bead, gauze, wire mesh, screen, foam, plate etc. Furthermore, other metals may also be present in the washcoat, including the base metals of Group VII and metals of Groups VB, VIB and VIB of the Periodic Table of Elements (e.g., chromium, copper, vanadium, cobalt, nickel, iron, etc). Though the applications and the operation conditions are different, typical standard preparation and composition of the supported ceramic or metallic Pt group metal catalysts, which are originally designed for fuel cell reformers as described in U.S. Pat. Nos. 4,522,894, 6,436,363 and 6,977,067, can be used to oxidize all fuels and can successfully be used for this invention.

The catalyst composition in the reaction zone serves to facilitate or promote combustion reactions among the fuel, steam and oxygen. Because the catalysts are prone to deactivation and breakdown at high temperatures (e.g., exceeding 1200° C.), it is preferred that the reaction zone be kept at temperatures between 150-1200° C., preferably between 150-1100° C. To initiate the reactions, the fuel mixture and the reaction zone may be preheated using any known conventional means to a temperature between 150-600° C. Or an electric hot wire, glow plug, spark plug or electric monolithic catalyst can also be used to preheat the fuel mixture instead. Once the hot exhaust gas is available and the fuel mixture contains at least one low temperature light-off chemical compound or a starter fluid, the oxidation reactions can be started by the hot recycled exhaust gas at a temperature <250° C.

In the present invention, the fuel mixture is reacted over catalyst with excess oxygen to form a high temperature and high-pressure reformate stream comprising steam (preferably >20%), $CO_2$, $N_2$, and unconverted $O_2$. To produce high temperature and high-pressure reformate stream, several key ratios (factors) must be monitored in the fuel feed mixture: a) $H_2O$ to C ratio, b) $O_2$ to C ratio and c), $CO_2/C$ ratio and (d) % fuel. More specifically, it is preferred that the $H_2O$ to C ratio is greater than 3.0, the $O_2$ to C ratio is over 1.0 and $CO_2/C$ ratio is over 0.05. Furthermore, depend on the latent heat of the fuel used; the maximum % fuel in the feed mixture can be various. But, it must have an upper limit to avoid producing too much combustion heats, which will deactivate or even melt the catalyst. Since the latent heats of all useful fuels vary in a wide range and the oxidation reactions over Pt group metal and/or commercial oxidation catalysts of every fuel mentioned in this invention are very fast, these ratios should be controlled individually and/or simultaneously depending on the specific fuel mixture composition to keep the reactions above a minimum operating temperature, and also to limit the reformer's maximum operating temperature below 1200° C. (preferably below 1100° C.). The adjustments of these ratios to control the reaction zone temperature can be within and/or outside the operating ranges mentioned previously and are within the skills of one skilled in the art.

For example, when methane is used as the hydrocarbon fuel, the following reactions are known to occur:

Catalytic Combustion: $CH_4 + 2 O_2 \rightarrow CO_2 + 2 H_2O$ 

Catalytic Partial Oxidation Reaction: $CH_4 + \frac{1}{2} O_2 = CO + 2 H_2$ 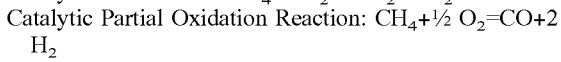

Steam Reforming Reaction: $CH_4 + H_2O = CO + 3 H_2$ 

Water Gas Shift Reaction: $CO + H_2O \rightarrow CO_2 + H_2$ 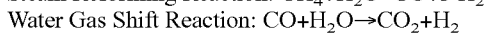

On the other hand, when ethanol is the fuel, the following reactions occur:

Complete Combustion: $C_2H_5OH + 3 O_2 \rightarrow 2 CO_2 + 3 H_2O$ 

Catalytic Partial Oxidation: $C_2H_5OH + \frac{1}{2} O_2 \rightarrow 2 CO + 3 H_2$ 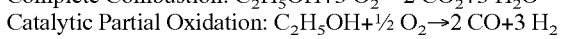

Thus, different fuels result in different amounts of $CO_2$ and water (e.g. steam).

Since only one reformer is used, excess oxygen must be used to assure complete combustion reactions of fuels over the catalyst. Otherwise, the catalytic partial oxidation reactions will occur in the reformer, and they will produce the intermediate product such as CO, $H_2$ and unconverted HC. In this case, some energy is wasted and pollutants are produced.

One skilled in the art would thus appreciate that the % fuel, $CO_2/C$, $O_2/C$ and $H_2O/C$ ratios should be adjusted for optimal operating conditions in the reaction zone (i.e. 150 - 1200° C.) due to the difference in oxidation reaction heats and product quantity.

The Generation of Electricity

Once the fuel mixture is reacted to produce a reformate stream comprising mainly steam, $CO_2$, $N_2$, and $O_2$, the high temperature and high pressure stream can be used to drive a turbine or a turbo charger, and the turbine or turbo charger is thus said to be in communication with the reaction zone. Therefore, the reformer and the turbine and/or turbocharger are considered as parts of a catalytic engine.

If this catalytic engine is connected to an electric generator, it can generate electricity as a stand-alone stationary or mobile power station.

Gas and Liquid Waste Treatment:

If this catalytic engine is connected to an adsorption or an absorption tower, the combustible gaseous or liquid wastes can be concentrated inside the tower by the adsorption or absorption processes. Typical adsorbent/absorbent such as high surface area activated carbon, aluminum oxide, silica oxide, zeolite etc can be used as a concentrator in the tower either in a fixed or a fluidized bed design. After reaching the saturation capacity, the concentrated wastes can be purged out from the tower by the recycled hot exhaust gas, and be injected with additional controlled amount of air, water and fuels into the reformer. Again, by controlling the % fuel, $H_2O/C$, $O_2/C$ and $CO_2/C$ ratios and the reactor temperature, the combustible wastes can be converted completely by the oxidation reactions over the Pt group metal and/or commercial oxidation catalysts into $CO_2$ and $H_2O$, and the gaseous or liquid wastes can be utilized to generate electricity by this catalytic engine.

Exemplary Embodiments Described

Using the teachings of the present invention, a number of different catalytic engine and system configurations are available to one skilled in the art.

For example, as shown in an exemplary embodiment in FIG. 1, there is shown a reaction zone 1 in communication with a turbine 2, which is in further communication with an electric generator 3. Prior to feeding into reaction zone 1, there is shown a water supply 4 from which water can be delivered by pump 5 to a purifier 6. The purified water may be stored in purified water container 7. The purified water is then mixed with a liquid fuel (such as ethanol, gasoline and surfactant mixture) from fuel supply 8 in mixer 9 to create a fuel mixture, and be fed into a heat exchanger 12 via pump 11 to preheat the hydrocarbon/alcohol mixture before feeding into the reaction zone 1. Various control valves 10 are situated along the paths to control the % fuel, $CO_2/C$, $H_2O/C$ and $O_2/C$ ratios as needed. However, for some fuels, it is necessary to by-pass mixer 9. They can be evaporated and heated separately, and be mixed with steam (water) after heat exchanger 12. In the reactor zone 1, the fuel mixture is reacted over the Pt group metal and/or commercial oxidation catalysts at a very high space velocity (residence time <300 milliseconds), and this high temperature and high pressure stream comprising steam and other gases is fed to the turbine 2 in communication with electrical generator 3. Note that a back-pressure regulator 50 is used to control the pressure inside the reactor zone 1. This regulator is used to regulate the reactor pressure and to control the gas speed to drive the downstream turbine. As known, the higher the reformer pressure, the larger the drop of pressure between the reaction zone and the turbine and, therefore, the faster the gas and the turbine speed.

Since excess oxygen is used in the feed mixture, complete oxidation reactions will occur over the Pt group metal and/or commercial oxidation catalysts in the reaction zone 1, and will produce pollution free exhaust gas. The complete oxidation reactions will produce reaction heats to vaporize water and to generate a high-pressure steam. Since the oxidation reactions are very fast and complete, the reactor's outlet temperature is therefore closely related to the $O_2/C$ of the feed mixture. Therefore, a thermocouple located at the outlet side of the reaction zone 1 can be used to adjust the $O_2/C$ ratio of the gas mixture. In other words, this thermocouple is useful as a feedback controller for regulating the $O_2/C$ ratio of the feed mixture.

After passing through the heat exchanger 12, portion of this reformate stream can be recycled by pump 25 to provide steam and $CO_2$ to the engine's feed mixture, other portion of the exhaust gas can pass through a condenser 13 to recycled steam in tank 14 for future use, and the remaining gas can be vented into atmosphere.

Figure 2:
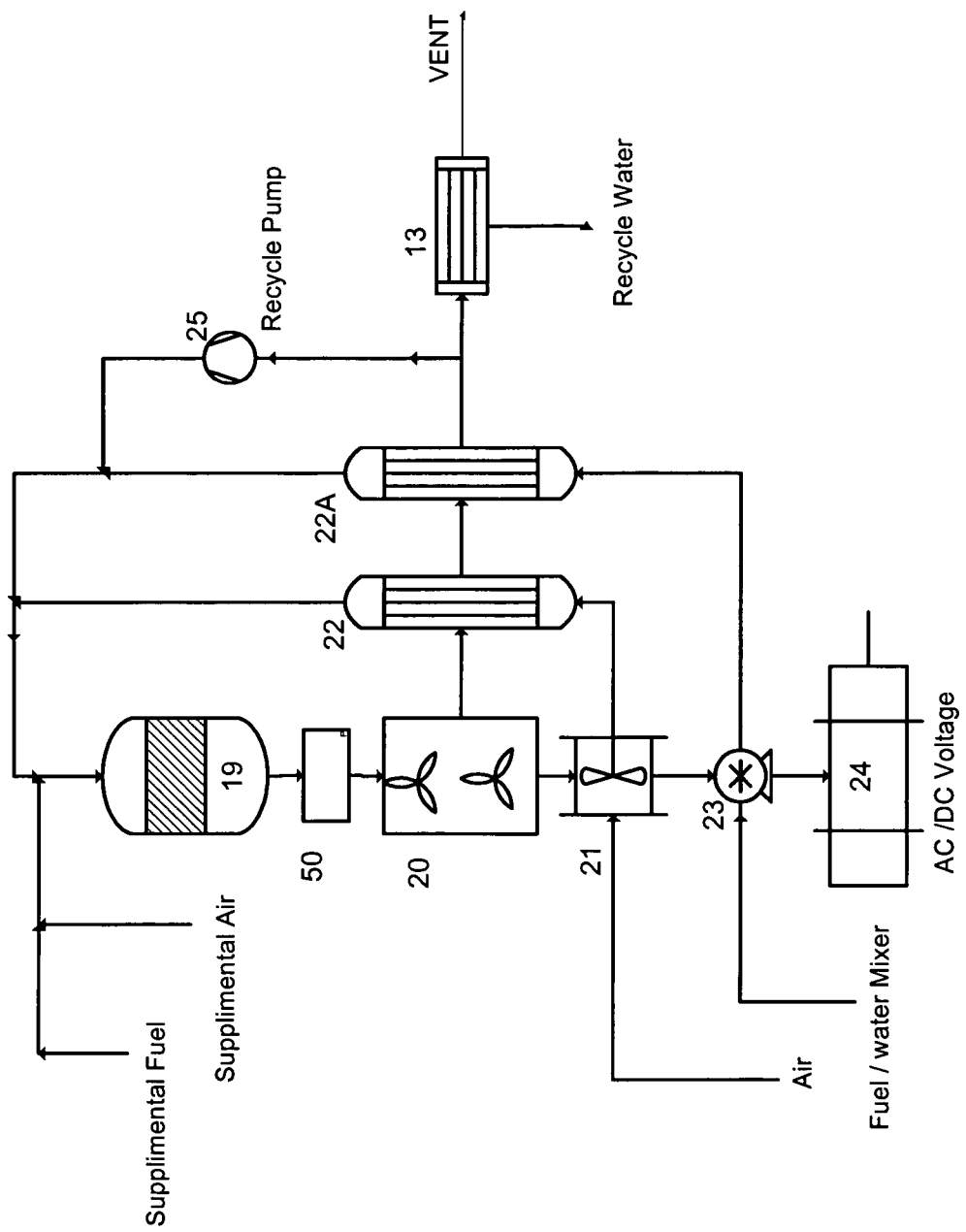
FIG. 2 is a schematic illustration of a catalytic engine for generating electricity in accordance with an alternative exemplary embodiment of the present invention.

In FIG. 2, there is shown an alternative exemplary embodiment of the catalytic engine of the present invention. As shown in FIG. 2, the water, air, fuel and the recycled reformate are fed separately into the reaction zone 19. That is, air compressor 21 is used to pump air through its own heat exchanger 22, and fuel pump 23 is used to pump fuel/water mixture through its own heat exchanger 22A as well. If the fuel mixer is originally in a liquid state, then the heat exchanger 22A is used to vaporize the fuel mixture to a gaseous state before injecting into the reaction zone 19. The two components are fed separately into reaction zone 19 to produce a high-pressure stream comprising of steam. The reformate stream is then fed into a turbine 20 which is in communication with compressor 21, pump 23 and an electrical generator 24.

As shown in FIGS. 1 and 2, the supplemental air and fuel lines can provide extra air and fuel (if necessary) to the reaction zones during the operation, especially at the start-up of this catalytic engine.

Figure 3:
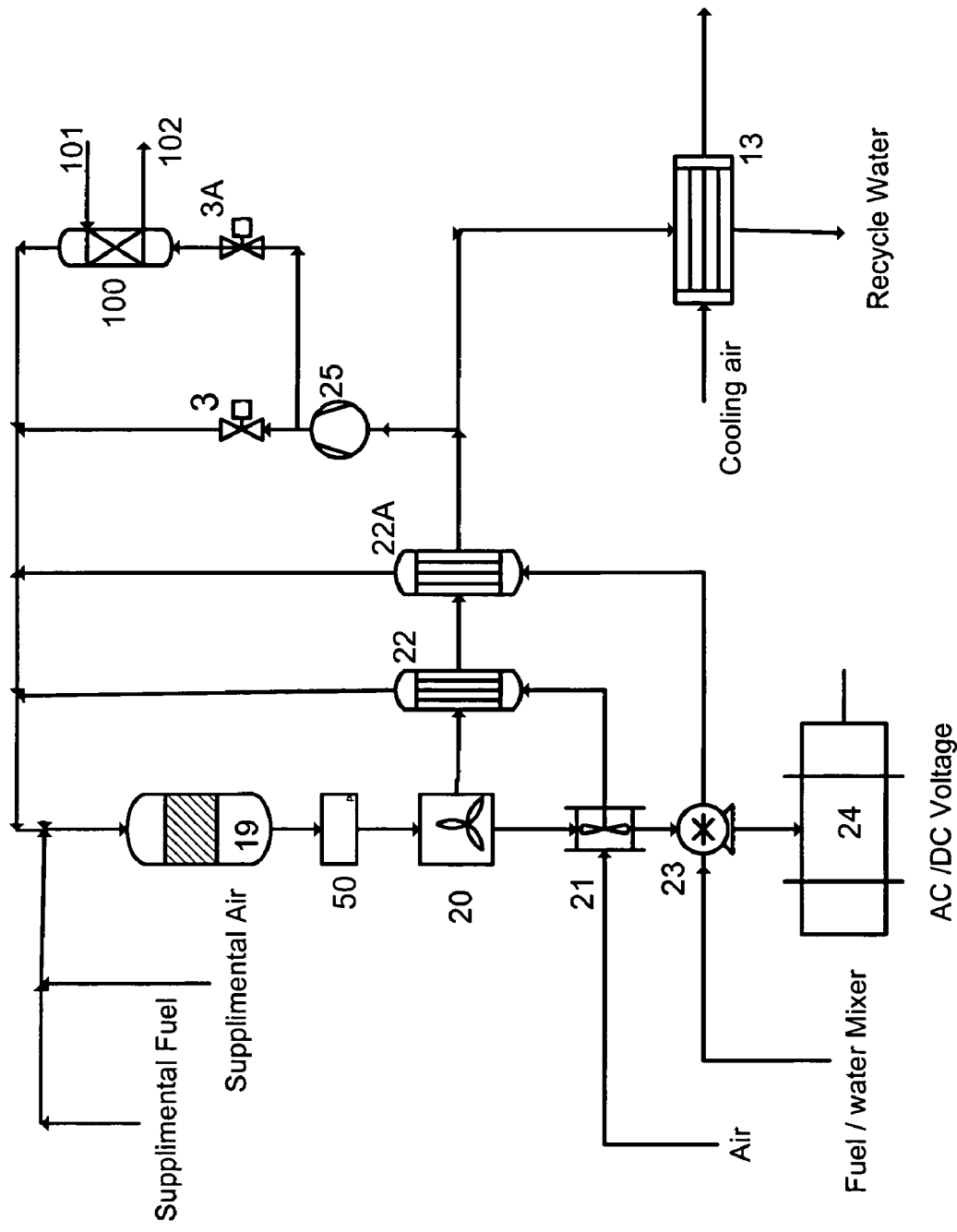
FIG. 3 is a schematic illustration for a process of using this catalytic engine to convert combustible gaseous and/or liquid organic wastes into electricity.

The catalytic engine can be connected to an adsorption/absorption tower 100 as shown in FIG. 3. Here, the gaseous and/or liquid waste compounds, such as volatile organic compounds from a paint booth; industrial waste HC stream etc. can be concentrated inside this tower by using high surface area adsorbents or absorbents. Typical adsorbents/absorbents are activated carbons, aluminum oxide, silica oxide, zeolites etc. If these adsorbents/absorbents have reached their saturation capacity, the adsorbed/absorbed waste compounds inside the tower 100 can be purged out by the hot recycled exhaust gas by properly open/close valves 3 and 3A, and the waste compounds can then be injected into the reactor zone 19 to be oxidized there.

Figure 4:
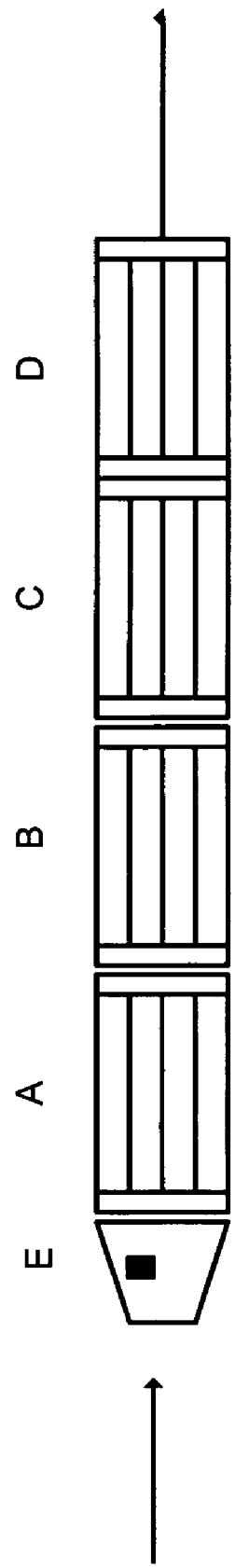
FIG. 4 is a schematic illustration of catalysts being used inside the reaction zone in accordance with the exemplary embodiment of the present invention.

The catalysts in the Oxidizer can be arranged as shown in FIG. 4, where samples A, B, C and D are commercial oxidation catalysts or supported monolithic Pt group metal catalysts containing one or more metals, especially Pt, Pd, Rh, Co, Ni and Fe. The total individual or mixed metal loadings in each of the four samples can be the same, or they can gradually be increased in metal loading to form a gradient catalyst system as shown in U.S. Pat. No. 6,436,363. The diameter of these samples can be the same as shown in FIG. 4. Also shown in FIG. 4, there is a flame igniter or an electric ignition device E to initiate the catalytic oxidation reactions in the reaction zone. The ignition device E can be an electric hot wire, an electric glow plug, spark plug, plasma device or an electrically heated monolithic catalyst containing Pt group metals. However, the hot exhaust gas can sometimes initiate the CPO reactions without any external heat source, especially if the fuel or fuel mixture contains at least one low temperature light-off fuel.

EXAMPLES

The following examples are provided to merely illustrate the non-limiting scope of the present invention. One skilled in the art will readily understand that many additional variations and embodiments are encompassed by the present invention.

The following examples are based on thermodynamic calculations using the HSC Chemistry Version 4.1 software (Outokumpu Research Oy, Pori, Finland). For example, the equilibrium gas composition for a given fuel feed mixture is first calculated at temperatures between 100 and 2500° C. The calculated equilibrium composition at a given temperature is then used to calculate the adiabatic temperature raise from the initial gas temperature at 100° C. However, it is found that, over a certain temperature range, the equilibrium composition is a strong function of temperature, i.e. a small change in temperature will cause a large change in equilibrium composition and thus affect the calculated adiabatic temperature (Tad). Therefore, the equilibrium composition at a given temperature and the calculated adiabatic temperature (Tad) for this composition should be iterated continuously until these two temperatures are finally matched. However, to demonstrate the effects of $H_2O/C$ and $O_2/C$ ratios on the reactor's operating temperature, and the importance of controlling these two ratios, satisfactory conclusions can be reached by using the approximate calculated values (±100° C.) as shown in the following tables.

Example 1

100 moles of various hydrocarbon mixtures comprising various amounts of methane and air are fed and reacted in the reaction zone. No water is used in this example. The calculated results from the HSC Chemistry Version 4.1 software are summarized in Table 1.

TABLE 1

Equilibrium Gas Composition and Adiabatic Temperatures (Tad, degree C.) for $CH_4$-Air Systems

| | | | | Equilibrium Gas Composition (moles) | | | | | | | |
|---|---|---|---|---|---|---|---|---|---|---|---|
| % CH4 | H2O/C | O2/C | Tad | N2 | H2O | H2 | CO | CO2 | CH4 | O2 | C |
| 4.76 | 0.00 | 4.20 | 1200.00 | 75.20 | 9.52 | 0.00 | 0.00 | 4.76 | 0.00 | 10.50 | 0.00 |
| 9.09 | 0.00 | 2.10 | 1980.00 | 71.80 | 17.90 | 0.25 | 0.64 | 8.45 | 0.00 | 1.35 | 0.00 |

TABLE 1-continued

Equilibrium Gas Composition and Adiabatic Temperatures (Tad, degree C.) for $CH_4$-Air Systems

| % CH4 | H2O/C | O2/C | Tad | N2 | H2O | H2 | CO | CO2 | CH4 | O2 | C |
|---|---|---|---|---|---|---|---|---|---|---|---|
| 16.67 | 0.00 | 1.05 | 1400.00 | 65.80 | 15.00 | 18.30 | 13.39 | 3.29 | 0.00 | 0.00 | 0.00 |
| 20.00 | 0.00 | 0.84 | 1110.00 | 63.20 | 10.60 | 29.40 | 17.00 | 2.96 | 0.00 | 0.00 | 0.00 |
| 28.57 | 0.00 | 0.53 | 690.00 | 56.40 | 4.96 | 47.20 | 18.60 | 3.23 | 2.51 | 0.02 | 4.25 |
| 33.30 | 0.00 | 0.42 | 657.00 | 52.70 | 7.14 | 50.80 | 13.50 | 3.67 | 4.34 | 0.01 | 11.80 |
| 41.18 | 0.00 | 0.30 | 605.00 | 46.50 | 10.80 | 52.80 | 6.84 | 3.54 | 9.39 | 0.00 | 21.40 |

This table lists the adiabatic temperature (Tad) as a function of % $CH_4$ (dry), and the product gas composition as a function of $H_2O/C$ and $O_2/C$ ratios. For $O_2/C$ ratios of 4.20 and 2.10, complete combustion reactions can be expected thermodynamically since all $CH_4$ are converted to $CO_2$ (no $H_2$ and CO), and the adiabatic temperatures after combustion are 1200° and 1980° C. respectively. As the $O_2/C$ ratios is shifted toward the lower values, more $H_2$ and CO and less amount of $CO_2$ are produced, indicating that the reaction mechanism is gradually shifting from the complete combustion reactions toward the partial oxidation reactions, and the calculated adiabatic temperatures are also gradually reduced to <1100° C.

As shown in Example 1, a sudden momentary increase in $O_2/C$ ratio to a value over 1.05 can cause the catalyst's temperature over 1400° C., this will cause permanent damage and/or even melt the catalyst. Furthermore, low $O_2/C$ ratios will produce coke (i.e. C). Thus, Example 1 confirms that U.S. Pat. No. 6,960,840 and other catalytic combustion technologies, which perform fuel combustion without water in the feed gas, are susceptible to thermal deactivation, coking and/or melting of its catalysts if the $O_2/C$ ratio is not controlled properly.

Example 2

Example 1 is repeated, except 100 moles of water are added to the same 100 moles of $CH_4$ and air mixture. The calculated adiabatic temperature raise (Tad, degree C) and the gas composition are summarized in Table 2.

By comparing Tables 1 and 2, under the exact $CH_4$/air mixture, the addition of water will reduce the adiabatic temperature and avoid coke formation, as shown in Table 2.

The results in Table 2 indicate that the use of steam in the feed gas is a useful improvement over Example 1. It is believed that steam, which has a higher heat capacity compared to other gases, absorbs reaction heats more efficiently to keep all adiabatic temperature below 1200° C. Furthermore, the addition of water to the feed mixture will shift the equilibrium composition, avoid coke formation and will favor easier and more flexible reformer operations. Thus, the catalyst life can be extended with the use of steam in the feed.

As shown in this table, feed gas mixture containing 4.76% $CH_4$, $H_2O/C=21.01$ and $O_2/C=4.20$ will produce reformate at 650° C., and gas mixture containing 9.09% $CH_4$, $H_2O/C=11.0$ and $O_2/C=2.10$ will produce reformate at 1080° C. These two operating conditions can be used to generate high temperature and high-pressure reformate to drive a turbine or a turbo charger. In other words, these two conditions can successfully be used in this invention.

Example 3

Example 1 is repeated except that 200 moles of water are added to the same 100 moles of $CH_4$ and air mixture. The calculated adiabatic temperature (Tad, degree C) and the gas composition are summarized in Table 3.

TABLE 2

Equilibrium Gas Composition and Adiabatic Temperature (Tad, degree C.) for $CH_4$-Air-Water (100 Kmoles) systems

| % CH4 | H2O/C | O2/C | Tad | N2 | H2O | H2 | CO | CO2 | CH4 | O2 | C |
|---|---|---|---|---|---|---|---|---|---|---|---|
| 4.76 | 21.01 | 4.20 | 650.00 | 75.20 | 110.00 | 0.00 | 0.00 | 4.76 | 0.00 | 10.50 | 0.00 |
| 9.09 | 11.00 | 2.10 | 1080.00 | 71.80 | 118.00 | 0.00 | 0.00 | 9.09 | 0.00 | 0.91 | 0.00 |
| 16.67 | 6.00 | 1.05 | 820.00 | 65.80 | 105.00 | 28.10 | 3.54 | 13.10 | 0.00 | 0.00 | 0.00 |
| 20.00 | 5.00 | 0.84 | 700.00 | 63.20 | 97.90 | 42.10 | 4.28 | 15.71 | 0.01 | 0.00 | 0.00 |
| 28.57 | 3.50 | 0.53 | 520.00 | 56.40 | 87.40 | 58.20 | 3.04 | 19.80 | 5.76 | 0.00 | 0.00 |

TABLE 3

Equilibrium Gas Composition and Adiabatic Temperature (Tad, degree C.) for $CH_4$-Air-Water (200 Kmols) Systems

| % CH4 | H2O/C | O2/C | Tad | N2 | H2O | H2 | CO | CO2 | CH4 | O2 | C |
|---|---|---|---|---|---|---|---|---|---|---|---|
| 4.76 | 42.02 | 4.20 | 470.00 | 75.20 | 210.00 | 0.00 | 0.00 | 4.76 | 0.00 | 10.50 | 0.00 |
| 9.09 | 22.00 | 2.10 | 770.00 | 71.80 | 218.00 | 0.00 | 0.00 | 9.09 | 0.00 | 0.91 | 0.00 |
| 16.67 | 12.00 | 1.05 | 600.00 | 65.80 | 203.00 | 30.80 | 0.92 | 15.80 | 0.03 | 0.00 | 0.00 |
| 20.00 | 10.00 | 0.84 | 525.00 | 63.20 | 195.00 | 44.70 | 1.03 | 18.80 | 0.16 | 0.00 | 0.00 |
| 28.57 | 7.00 | 0.53 | 440.00 | 56.40 | 190.00 | 50.90 | 0.65 | 19.70 | 8.18 | 0.00 | 0.00 |

Compared to Example 2, Table 3 shows that an additional 100 moles of water further reduces the adiabatic temperature in the reaction zone. Table 3 illustrates that in some cases (i.e. low $O_2/C$ ratios), the reactor temperatures are too low, indicating that catalysts may lost their activities due to low operating temperatures and may have problems of producing high-pressure reformate. Thus, Table 3 confirms the importance of maintaining control and optimizing the % $CH_4$, $O_2/C$ and $H_2O/C$ ratios of the feed gas.

Example 4

Example 1 is repeated except that ethanol was used as the fuel source instead of methane. The results of these thermodynamic calculations are shown in Table 4.

As shown in Table 4, the adiabatic temperatures for the $O_2/C$ ratios between 2.10 and 0.70 rose over 1400° C. and, thus, the catalysts will melt and/or become thermally deactivated. Even for the $O_2/C$ ratio of 0.26, there is a risk of catalyst deactivation as a result of carbon formation, which will block the catalyst bed and cause flow disturbance. Therefore, like Example 1 with methane, Table 4 confirms that the use of ethanol and air without water in the feed mixture does not lead to a thermally efficient or successful operation of a catalytic reformer.

TABLE 4

Equilibrium Gas Composition and Adiabatic Temperature (Tad, degree C.) for Ethanol-Air Systems

| % C2H5OH | H2O/C | O2/C | Tad (C.) | N2 | H2O | H2 | CO | CO2 | CH4 | O2 | C2H5OH | C |
|---|---|---|---|---|---|---|---|---|---|---|---|---|
| 2.44 | 0 | 4.2 | 985.9 | 77.1 | 7.32 | 0 | 0 | 4.88 | 0 | 13.2 | 0 | 0 |
| 4.76 | 0 | 2.1 | 1650 | 75.2 | 14.3 | 0 | 0.03 | 9.49 | 0 | 5.75 | 0 | 0 |
| 6.54 | 0 | 1.5 | 1760 | 73.8 | 16.9 | 0.038 | 0.121 | 11.2 | 0 | 2.79 | 0.901 | 0 |
| 9.09 | 0 | 1.05 | 1730 | 71.8 | 18.4 | 0.064 | 0.196 | 12.1 | 0 | 0.765 | 2.94 | 0 |
| 13.04 | 0 | 0.7 | 1460 | 68.7 | 18.8 | 1.01 | 2.14 | 11.1 | 0 | 0 | 6.43 | 0 |
| 16.67 | 0 | 0.52 | 880 | 65.8 | 11.7 | 38.3 | 26.7 | 6.66 | 0.06 | 0 | 0.06 | 0 |
| 20 | 0 | 0.42 | 685 | 63.2 | 7.71 | 47.9 | 29.7 | 8.09 | 2.19 | 0 | 0 | 0 |
| 28.5 | 0 | 0.26 | 630 | 56.4 | 15.6 | 57.7 | 19.5 | 11.7 | 6.22 | 0 | 0 | 19.7 |

Example 5

Example 4 is repeated, except 100 moles of water are added to 100 moles of ethanol and air mixture. The results of the thermodynamic calculations are shown in Table 5.

TABLE 5

Equilibrium Gas Composition and Adiabatic Temperature (Tad, degree C.) for Ethanol-Air-Water (100 Kmole) Systems

| % C2H5OH | H2O/C | O2/C | Tad (C.) | N2 | H2O | H2 | CO | CO2 | CH4 | O2 | C2H5OH | C |
|---|---|---|---|---|---|---|---|---|---|---|---|---|
| 2.44 | 20.49 | 4.2 | 539.7 | 77.1 | 107 | 0 | 0 | 4.88 | 0 | 13.2 | 0 | 0 |
| 4.76 | 10.5 | 2.1 | 886.1 | 75.2 | 114 | 0 | 0 | 9.52 | 0 | 5.72 | 0 | 0 |
| 6.54 | 7.65 | 1.5 | 1140 | 73.8 | 120 | 0.008 | 0.002 | 13.1 | 0 | 0.012 | 0 | 0 |
| 9.09 | 5.5 | 1.05 | 1000 | 71.8 | 114 | 13.4 | 3 | 15.2 | 0 | 0 | 0 | 0 |
| 13.04 | 3.83 | 0.7 | 800 | 68.7 | 104 | 35.4 | 6.34 | 19.7 | 0 | 0 | 0 | 0 |
| 16.67 | 3 | 0.52 | 635 | 65.8 | 92.7 | 57.1 | 7.37 | 25.8 | 0.147 | 0 | 0 | 0 |
| 20 | 2.5 | 0.42 | 560 | 63.2 | 86.9 | 66.8 | 6.92 | 29.9 | 3.16 | 0 | 0 | 0 |
| 28.57 | 1.75 | 0.26 | 510 | 56.4 | 85.2 | 65.1 | 5.56 | 33.9 | 17.7 | 0 | 0 | 0 |

Table 5 shows that, with the addition of steam, complete combustion can be achieved under several $O_2/C$ ratios and the adiabatic temperatures can still remain below 1140° C. without carbon formation. Therefore, these conditions can be chosen as the operating conditions for this catalytic engine. Furthermore, because of the difference in the latent heat, the results of Tables 2 and 5 indicate that the optima $O_2/C$ ratio and the maximum % fuel to limit the reactor's temperature <1100° C. will depend on the fuels used.

Example 6

Example 4 is repeated, except 200 moles of water are added to 100 moles of ethanol and air mixture. The results of the thermodynamic calculations are shown in Table 6.

Like Example 3, Table 6 again confirns the reduction of operating temperatures and catalytic activities when excess $H_2O$ is added. Again, the optima operating $H_2O/C$ and $O_2/C$ ratios to limit the reactor's temperature <1100° C. vary with the type of fuels used.

TABLE 6

Equilibrium Gas Composition and Adiabatic Temperature for Ethanol-Air-Water (200 Kmole) Systems

| | | | Tad | Equilibrium Gas Composition (moles) | | | | | | | | |
|---|---|---|---|---|---|---|---|---|---|---|---|---|
| % C2H5OH | H2O/C | O2/C | (C.) | N2 | H2O | H2 | CO | CO2 | CH4 | O2 | C2H5OH | C |
| 2.44 | 40.98 | 4.2 | 394.6 | 77.1 | 207.3 | 0 | 0 | 4.88 | 0 | 13.2 | 0 | 0 |
| 4.76 | 21.01 | 2.1 | 642.4 | 75.2 | 214.3 | 0 | 0 | 9.52 | 0 | 5.72 | 0 | 0 |
| 6.54 | 15.29 | 1.5 | 816.4 | 73.8 | 219.6 | 0 | 0 | 13.1 | 0 | 0.1 | 0 | 0 |
| 9.09 | 11 | 1.05 | 735 | 71.8 | 212 | 15.4 | 0.924 | 17.3 | 0 | 0 | 0 | 0 |
| 13.04 | 7.67 | 0.7 | 600 | 68.7 | 199 | 39.8 | 1.85 | 24.2 | 0.011 | 0 | 0 | 0 |
| 16.67 | 6 | 0.52 | 510 | 65.8 | 189 | 58.3 | 1.9 | 30.2 | 1.19 | 0 | 0 | 0 |
| 28.57 | 3.5 | 0.26 | 445 | 56.4 | 186 | 60.1 | 1.48 | 35.7 | 20 | 0 | 0 | 0 |

I claim:

1. A process of operating a catalytic engine which consists of a catalytic fuel reformer and a turbine/turbo charger, comprising the steps of:
   a) Introducing a stream of a fuel mixture into an inlet of a catalytic fuel reformer's reaction zone:
      i) Said inlet fuel mixture comprising of fuels, steam, supplemental air and portion of exhaust gas re-circulated from said turbine/turbo charger through an exhaust line to provide heat, steam, oxygen and $CO_2$ to the fuel mixture, and said fuel mixture having a limited % fuels $H_2O/C$ ratio >3.0, $O_2/C$ ratio >1.0 and $CO_2/C$ ratio >0.05,
      ii) Said catalytic fuel reformer's reaction zone containing one or more supported or unsupported Pt group metal catalysts and/or oxide oxidation catalysts,
   b) Reacting said fuel mixture without overheating said catalysts and without coke formation in said fuel reformer's reaction zone at a temperature between 150-1200° C. and a pressure between 1 to 100 atmosphere to produce a complete combustion reformate comprising mainly of steam, $CO_2$, $O_2$ and $N_2$,
   c) Discharging the reformate from said fuel reformer to drive a downstream steam turbine, turbo charger or gas turbine.

2. The process of claim 1, wherein the % fuels, $H_2O/C$, $CO_2/C$ and $O_2/C$ ratios of said inlet fuel mixture are adjusted individually or simultaneously for the purpose of controlling the reformer's reaction at a temperature constantly below 1200° C. and at a pressure between 1 to 100 atmosphere.

3. The process of claim 1, wherein said inlet fuel mixture is contacted with said catalysts inside the reformer's reaction zone at a residence time less than 300 milliseconds.

4. The process of claim 1, wherein the supported or unsupported Pt group metal catalysts are selected from the group consisting of platinum, palladium, rhodium, iridium, osmium, ruthenium and mixtures thereof.

5. The process of claim 1, wherein said inlet fuel mixture contains >20% water/steam for the purpose of absorbing more reaction heat to reduce the reaction zone's temperature and to drive a downstream steam turbine/turbo charger by the reformer's reformate.

6. The process of claim 1, wherein an external heat source selected from the group consisting of an electric hot wire, glow plug, spark plug, plasma device, and electrically heated monolith catalyst containing Pt group metal catalysts is used during the reformer's start-up period to initiate the oxidation reactions in said reaction zone.

7. The process of claim 1, wherein thermocouples or temperature sensing elements are installed inside or outside of the reformer's reaction zone, and they are used as feedback controllers to regulate the % fuels and/or the $O_2/C$ ratio in the fuel mixture for the purpose of keeping the reformer's temperature below 1200° C.

8. The process of claim 1, wherein said catalytic engine is connected to an electric generator to form a stationary or mobile power station.

9. The process of claim 4, wherein the unsupported Pt group metal catalysts in the reaction zone are present in the shape of gauge, screen, wire mesh, porous foam, plate.

10. The process of claim 4, wherein said supported Pt group metal catalysts in the reformer's reaction zone are present in the form of washcoats comprising support oxides which are impregnated with the Pt group metal catalysts.

11. The process of claim 10, wherein said washcoats containing Pt group metal catalysts are further coated on various inert ceramic or metallic substrates in the shape of monolith, pellet, bead, porous foam, plate, or static mixer.

12. The process of claim 10, wherein said support oxides are one or more oxides selected from the group consisting of $Al_2O_3$, cerium oxide, zirconium oxide , cerium-zirconium oxide, cerium-zirconium rare earth oxide and/or its composite and mixtures thereof.

13. The process of claim 1, wherein said oxide oxidation catalyst are selected from the group consisting of oxides of copper, vanadium, cobalt, nickel, iron, cerium, zirconium, and mixtures thereof.

14. The process of claim 12, wherein the support oxides are further impregnated and/or mixed with one or more additional oxides selected from the group consisting of lanthanum, praseodymium, yttrium, calcium, barium, strontium, magnesium and mixtures thereof.

15. The process of claim 10, wherein the Pt group metals in the washcoats are present in the amount of 0.01 to 10 wt % of the oxides.

16. The process of claim 11, wherein said inert ceramic substrate is selected from the group consisting of alumina, alumina-silica, alumina-silica-titania, mullite, cordierite, zirconia, zirconia-ceria, zirconia-spinel, zirconia-mullite or silicon carbide, and the substrate is in the shape of monolith, pellet, bead, porous foam, plate, or static mixer.

17. The process of claim 1, wherein said fuels in the inlet fuel mixture are one or more chemical compounds selected from the group consisting of methane, LPG, gasoline, diesel, jet fuel, natural gas, $C_1$-$C_8$ alcohols, bio-ethanol, bio-diesel, biobutanol, bio-methane and mixtures thereof.

* * * * *